Figure 1:
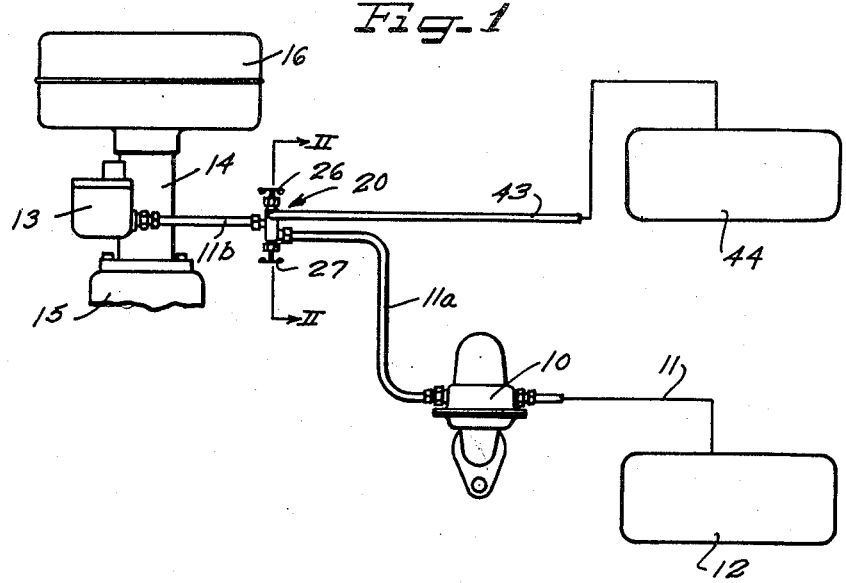

Feb. 23, 1965 S. WAGNER 3,170,495
FUEL EXCHANGER DEVICE
Filed Sept. 19, 1962

INVENTOR.
Samuel Wagner
BY
ATTORNEYS

United States Patent Office 3,170,495
Patented Feb. 23, 1965

3,170,495
FUEL EXCHANGER DEVICE
Samuel Wagner, 2405 Hillsdale Drive E.,
Brookfield, Wis.
Filed Sept. 19, 1962, Ser. No. 224,706
3 Claims. (Cl. 141—388)

This invention relates to a fuel exchange device and to a method of transferring fluid fuel from one motor vehicle to another.

The situation frequently arises where a motorist traveling along a highway runs out of gasoline, or other liquid fuel, without having a reserve can of fuel to fall back upon. In such cases, even though a passing motorist is willing to spare some of his own fuel, the task of siphoning the fuel out of one tank and into the empty tank is a difficult one, at best. Police cars frequently carry with them a spare can of gasoline for the purpose of assisting motorists in need of gasoline, but there are certain hazards attendant upon carrying a spare can of gasoline in the trunk of a police car, since the trunk also may enclose electrical devices, such as radio and radar equipment, capable of causing explosions if the gasoline fumes should accumulate in the trunk space. Since this has actually happened in many instances, and since, even in the absence of the explosion hazard, unpleasant odors of gasoline are likely to become disagreeable to the occupant of a car carrying a spare gasoline can, considerable resistance on the part of the police to carrying such spare cans of gasoline in the trunks of their cars has arisen.

The present invention eliminates the hazards of such procedure and makes it possible for police cars, as well, of course, as private cars, to perform the acts of kindness to other motorists with great ease and with no attendant risks. My invention provides a fuel exchanger device in the fuel line between the motor and the motor operated means for pumping fuel from the tank of the car to the motor. The fuel exchange device suitably comprises a multi-passaged valve, a flexible tube for connection between such valve and the tank of the other vehicle, and a union, or the like, for attachment of the flexible tube to the valve and so constructed that by the very act of attachment, the valve is operated to establish flow communication from the fuel line of the one vehicle through the flexible tube to the fuel tank of the other vehicle.

It is therefore an important object of this invention to provide a new and improved system for exchanging liquid fuel between two motor vehicles, employing the motor of one of the vehicles for transferring the fuel from that vehicle to the second vehicle.

It is a further object of my invention to provide a fuel exchanger device for use in the transfer of liquid fuel from one motor vehicle to another, in accordance with which upon making the necessary connection, flow communication is established through the fuel line of the one vehicle into the fuel tank of the other vehicle.

Figure 2:
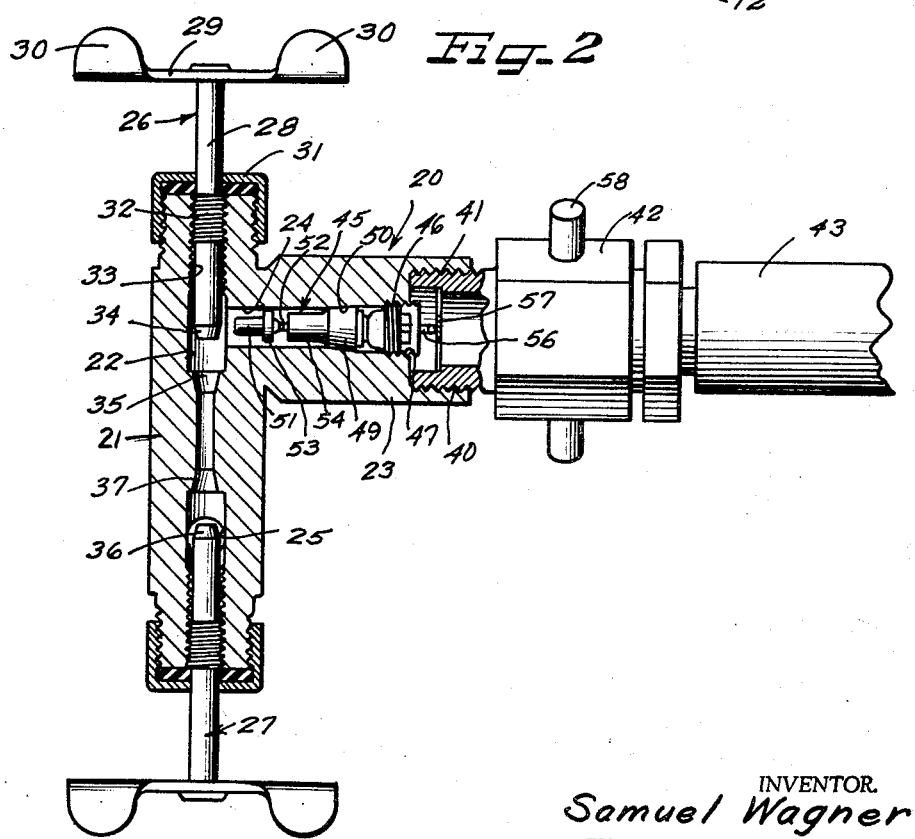

Other and further important objects of this invention will become apparent from the following description of the embodiments of the invention illustrated in the accompanying drawings, in which:

FIGURE 1 is a partly schematic elevational view of a system embodying the principles of my invention; and FIGURE 2 is an enlarged sectional view taken substantially along the line II—II of FIGURE 1, with parts in elevation.

As shown on the drawing:

The reference numeral 10 indicates a motor-driven fuel pump in a typical installation of an internal combustion engine of a motor vehicle, such as a gasoline-driven automobile. Said fuel pump 10 is positioned in a fuel line, generally indicated by the reference numeral 11, between a fuel tank 12 and a carburetor 13 connected into the air intake 14 leading to an internal combustion engine 15. A conventional air cleaner 16 filters the air as it is drawn into the intake, or throat, 14, where admixture with the liquid fuel from the carburetor 13 takes place. With the engine 15 in operation, fuel is drawn from the tank 12 through the line 11 under the action of the pump 10 and discharged from the pump 10 through continuations 11a and 11b of the fuel line 11 into the carburetor 13.

In accordance with the principles of my present invention, a fuel exchanger device, indicated generally by the reference numeral 20 is positioned in the line 11a–11b between the fuel pump 10 and the carburetor 13. Said device 20 suitably takes the form of a multi-passaged valve having an elongated body portion 21 defining an axially extending passage 22, and a second body portion 23 at right angles to the first body portion 21 and providing an axially extending passage 24 in flow communication with the passage 22. The feed line extension 11a connects into the passage 22 at the lower end thereof (as viewed in FIGURE 2) through a transverse passage 25 that is also in flow communication with the axially extending passage 22.

Opposite ends of the body portion 21 are similarly constructed and similarly provided with manually operated valves, of which the upper valve, as shown in FIGURE 2, is identified by the reference numeral 26 and the lower valve by the reference numeral 27. Said valve 26 comprises a stem portion 28, to the outer end of which is attached a handle 29 having upstanding wing portions 30 to facilitate manual operation. Said stem 28 extends through a conventional packing gland 31, beyond which the stem 28 is externally threaded, as at 32, for threading engagement with an internally threaded portion 33 of said passage 22. The lower end of the stem 28 is tapered as at 34 for seating in a seat 35 formed by a conically reduced portion of the passage 22 beyond the connection with the transverse passage 24. The valve 27 is similarly provided with a tapered end portion 36 for seating in a conical portion 37 located in the internal passage 22 above the side opening connection 25, as viewed in FIGURE 2. The valve 27 thus controls the flow of fuel from the fuel line extension 11a into the lower portion of the axially extending passage 22, while the upper valve 26 controls the flow of fuel from the upper end of the passage 22 into the portion 11b of the fuel line leading from the device 20 to the carburetor 13.

The transversely extending body portion 23 is provided with a threaded counterbore 40, coaxial with the transverse passage 24 therein, for threadingly receiving an externally threaded end 41 of a union fitting 42. Said union fitting 42 serves to provide a connection between the passage 24 and a flexible tube 43 that my invention provides for the delivery of liquid fuel from the tank 12 of the one motor vehicle to the empty tank 44 of a second motor vehicle.

As best shown in FIGURE 2, a valve assembly, indicated generally by the reference numeral 45, commonly known as a Schrader-type of valve, is positioned in the transverse passage 24. Said valve assembly 45, as is common in this type of valve, comprises a threaded end portion 46 for threading engagement with the correspondingly internally threaded portion 47 at the outer end of said passage 24; a tapered intermediate portion 49, usually of resilient material such as rubber, for wedging engagement in a correspondingly tapered portion 50 of said passage 24; and an inner end portion 51 attached to a depressible plunger 52 and carrying an annular valve 53 normally seated against the end of the continuously passaged body 54 of said valve assembly 45. The outer end, 56, of said plunger 52 extends outwardly of the threaded end 46 of said valve body 54 and is depressible, against action of a spring (not shown) to space the valve 53 from the end of the valve housing 54, as shown in FIGURE 2, and thereby open said valve assembly. For accomplishing the depression of said plunger 52, the threaded end 41 of said fitting 42 is provided with a cross-bar, or spider 57, which, when the union fitting 42 is threaded home, automatically depresses the extended end 56 of said plunger 52 and opens the valve by unseating the valve 53 from its seat against the end of the housing 54. The union fitting 42 is provided with radially extending arms 58 to facilitate the turning of the union fitting into plunger-depressing position.

With the valves 26 and 27 both open, fuel flow communication is established between the feed line extension 11a and the further extension 11b so that when the engine 15 is running, fuel is being pumped by the pump 10 from the gas tank 12 through the feed lines 11, 11a and 11b into the carburetor 13, and thence through the throat 14 into the engine 15. This, of course, is normal during operation of the motor vehicle of which the engine 15 is a part.

When it is desired to transfer fuel from the tank 12 of the one motor vehicle into the fuel tank 44 of a second vehicle, the union fitting 42, which may be connected but non-operatively connected to the multi-passaged valve assembly 20, is manipulated to thread home the threaded portion 41 of such union fitting and thereby depress the plunger 52 of the valve assembly 45 through inward movement of the extended end 56 of said plunger by contact with the spider or cross-bar 57 of the union. When in the open position, as shown in FIGURE 2, and with the flexible tube 43 extending into the gas tank 44, operation of the engine 15 suffices of itself to transfer gasoline from said fuel tank 12 into the fuel tank 44 of the second motor vehicle. The valves 26 and 27 are left open under these circumstances, so as to keep the engine 15 running, but a portion of the supply of fuel entering the axially extending passage 22 flows out through the transverse passage 24 and through the passaged housing 54 of the valve assembly 45, and through the union fitting 42 into the flexible tube 43 and thence into the gas tank 44 of the second motor vehicle.

In this way fuel may be readily transferred from one motor vehicle to a second one, without difficulty and without any hazard to the operator. The only acts required of the operator are those of threading home the union fitting 42 and positioning the free end of the flexible tubing 43 in the gas tank 44 of the second motor vehicle, using the fuel spout (not shown) for that purpose. The valves 26 and 27 ordinarily need not be operated, being left open at all times, except when repairs become necessary or it is desired to dis-assemble the valve assembly 45.

It will be understood that modifications and variations may be effected without departing from the scope of the novel concepts of the present invention.

I claim as my invention:
1. In a system for exchanging liquid fuel between two motor vehicles each having a fuel container, a motor, a fuel line therebetween and motor operated means for pumping fuel from said container through said line to said motor,
 a fuel exchanger device comprising a multi-passaged valve in the line of one of said vehicles, and
 a flexible tube for connection to said valve with its delivery end in the tank of the other of said vehicles whereby the pump of said first vehicle can be operated to cause fuel from said one line to be pumped into the container of said other vehicle.
2. In a system as defined by claim 1, wherein
 the multi-passaged valve has a depressible valve and
 a union is carried by the valve end of said flexible tube and is provided with a detent for depressing said depressible valve upon connection thereto.
3. In a system for exchanging liquid fuel between two motor vehicles, each such vehicle having an internal combustion engine, a fuel container, a fuel line from said container to said engine and pump means operated by said engine for pumping fuel from its container through its corresponding line to its corresponding engine,
 a fuel exchanger device comprising a multi-passaged valve in the line of one of said vehicles,
 said valve having a through passage for continuous passage of fuel from the fuel container of said one vehicle to the engine thereof and having a valve-controlled by-pass, and
 a flexible tube for connection to said valve with its delivery end in the fuel container of the other of said vehicles and with its receiving end connected to said by-pass passage, whereby the pumping means of said first vehicle can be operated when said by-pass valve is open to cause fuel from said line of said one vehicle to be pumped into the fuel container of said other vehicle.

References Cited by the Examiner
UNITED STATES PATENTS

| | | | |
|---|---|---|---|
| 782,730 | 2/05 | Dunwoody | 251—330 |
| 1,685,927 | 10/28 | Miller | 141—1 |
| 2,563,244 | 8/51 | Holicer | 251—330 |
| 2,672,189 | 3/54 | Welch. | |
| 2,818,891 | 1/58 | Loeser | 141—388 |
| 2,861,532 | 11/58 | Ault | 141—388 |
| 2,947,330 | 8/60 | Savage | 141—1 |
| 2,948,306 | 8/60 | Kuraeff | 141—388 XR |
| 2,997,180 | 8/61 | Loveday. | |

FOREIGN PATENTS

| | | |
|---|---|---|
| 1,201,524 | 7/59 | France. |
| 19,487 | 9/01 | Great Britain. |

LAVERNE D. GEIGER, *Primary Examiner.*